(12) United States Patent
Beutner et al.

(10) Patent No.: US 6,573,995 B1
(45) Date of Patent: Jun. 3, 2003

(54) SENSOR DEVICE FOR DETECTING A DEGREE OF WETTING AND/OR SOILING OF A VEHICLE PANE, AND A METHOD OF PRODUCING THE SENSOR DEVICE

(75) Inventors: Achim Beutner, Lippstadt (DE); Christian Boehlau, Lippstadt (DE); Heiko Schaefer, Erwitta (DE)

(73) Assignee: Hella KG Hueck & Co., Lippstadt (DE)

( * ) Notice: Subject to any disclaimer, the term of this patent is extended or adjusted under 35 U.S.C. 154(b) by 142 days.

(21) Appl. No.: 09/714,124

(22) Filed: Nov. 17, 2000

(30) Foreign Application Priority Data

Nov. 18, 1999 (DE) .......................... 199 55 423

(51) Int. Cl.⁷ .......................... G01N 21/55; G02B 6/42
(52) U.S. Cl. .................... 356/445; 250/227.25
(58) Field of Search ............. 356/445; 250/227.25, 250/339.1; 318/480, 483

(56) References Cited

U.S. PATENT DOCUMENTS

| | | | |
|---|---|---|---|
| 5,262,640 A | * 11/1993 | Purvis et al. | 250/227.25 |
| 5,414,257 A | * 5/1995 | Stanton | 250/227.25 |
| 5,898,183 A | * 4/1999 | Teder | 250/227.25 |
| 6,052,196 A | * 4/2000 | Pientka et al. | 250/227.25 |

FOREIGN PATENT DOCUMENTS

| | | |
|---|---|---|
| DE | A13203091 | 8/1983 |
| DE | C14006174 | 7/1991 |
| DE | C14027367 | 7/1991 |
| DE | C119713910 | 7/1998 |
| DE | C219815748 | 10/1999 |

OTHER PUBLICATIONS

Lexikon Maschinenbau (Dictionary of Mechanical Engineering), VDI Publisher, Dusseldorf, 1995, pp. 1135–1137 Note: 1995 is sufficiently earlier than the priority date of Nov. 18, 1999.

* cited by examiner

*Primary Examiner*—Ricky Mack
*Assistant Examiner*—Alicia M Harrington
(74) *Attorney, Agent, or Firm*—Birch, Stewart, Kolasch & Birch, LLP

(57) ABSTRACT

A sensor device for detecting the degree of wetting and/or soiling of a pane or windshield arranged in a motor vehicle includes individual radiation guide elements integrally molded onto a wall of a housing to be separated from one another by a blocking element of the wall. This reduces the amount of ambient radiation from the environment. A radiation emitter and a radiation receiver are structured as SMD components which are arranged on a circuit board carrier. The sensor device created in this way has a simple and compact design.

9 Claims, 2 Drawing Sheets

SENSOR DEVICE FOR DETECTING A DEGREE OF WETTING AND/OR SOILING OF A VEHICLE PANE, AND A METHOD OF PRODUCING THE SENSOR DEVICE

This application claims priority, based on German application 199 55 423.4, filed Nov. 18, 1999.

BACKGROUND OF THE INVENTION

This invention relates to a sensor device for detecting the degree of wetting and/or soiling of a light-transmissive pane, such as a window pane, in a motor vehicle having a housing including radiation guide, or conductor, elements that can be coupled to an inner surface of the pane, a radiation emitter and radiation receiver, each of which is provided with a collecting/directional element coupled to in the respective radiation guide element, with the optical axes of the collecting/directional elements being arranged at acute angles to the pane, and with the radiation guide elements being arranged flush to a wall of the housing facing the pane on a side facing away from the radiation emitter and/or radiation receiver.

Furthermore, this invention relates to a method of producing a sensor device for motor vehicles which is attached by a transparent coupling medium to an inside surface of the pane in the motor vehicle.

German Patent. 40 27 367 C1 describes a sensor device for detecting the degree of wetting of a window pane in a motor vehicle, including a plurality of optical components. In addition to a reflector that reflects radiation of a radiation emitter, there is a radiation guide element on whose edge face a mirrorized coating is provided, so that the radiation strikes the window pane at a predetermined angle of incidence. A radiation receiver is positioned so that radiation that is totally reflected on the window pane strikes the radiation receiver after being guided through the same radiation guide element. In an area between the radiation receiver and the window pane there is a layer of a non-transparent material with which it is possible to reduce the ambient light radiation, which would falsify the result of the measurement. It is disadvantageous of this known sensor device that the radiation emitted by the radiation emitter undergoes repeated necessary reflections before striking the window pane. This leads to a reduced radiation yield and negatively affects a tolerance sensitivity of the radiation receiver and the radiation emitter. Furthermore, this known sensor device requires a relatively complex design.

German Patent 197 13 910 C1 describes a sensor device for detecting the degree of wetting of a pane on a motor vehicle, providing a one-piece radiation guide element with recesses arranged on a side facing away from the window pane, and a radiation emitter and a radiation receiver mounted in each recess. One disadvantage of this known sensor device is that multiple reflections are provided in the radiation guide element, leading to a reduction in radiation yield. Furthermore, no shielding or covering measures are provided to prevent detection of unwanted ambient radiation.

German Patent 40 06 174 C1 describes a sensor device for detecting the degree of wetting of a pane in a motor vehicle, where a one-piece radiation guide element is provided, having respective collecting lenses for a radiation emitter and a radiation receiver. A layer of a reflective material is applied to a top or bottom side of the radiation guide element in an area between the projecting collecting lenses, so that beams emitted by the radiation emitter can be directed toward the radiation receiver by multiple reflections. However, this yields a relatively long beam path, with necessary multiple reflections resulting in a reduction in radiation yield.

An object of the present invention is to provide an improvement to a sensor device for detecting the degree of wetting of a pane of a motor vehicle such that a compact and simple structure of the sensor device is achieved in an uncomplicated manner while an improvement in optical properties is achieved.

Furthermore, it is an object of the present invention to provide a method of producing a sensor device that can be carried out inexpensively and by simple manufacturing technology.

SUMMARY OF THE INVENTION

According to principles of this invention, a sensor device of the general type set forth in the opening paragraphs above includes a separate radiation guide element for each of the radiation emitter and the radiation receiver, with the radiation guide elements being connected as one piece with a wall.

A particular advantage of the sensor device of this invention is that a path of radiation between the radiation emitter and the radiation receiver is relatively short, and, with the exception of a reflection at an outside surface of the pane, there is no unwanted reflections required. Thus light efficiency can be greatly improved. Because the radiation guide elements are formed as one piece with the wall of a housing, the wall has the function of supporting the radiation guide elements while providing a radiation shield, since it is not transparent, so as to prevent unwanted penetration of ambient light into the housing.

According to a particular embodiment of this invention, a blocking element arranged between the radiation guide elements reduces the amount of ambient radiation entering from the environment. The radiation guide elements need not be directly connected to one another, so they can be structured in a manner that saves on material and space.

According to a particular embodiment of this invention, the non-transparent blocking element is part of the wall of the housing which faces the pane and has openings in which the individual radiation guide elements are mounted, each to have a surface flush with a surface of the wall. The wall and the radiation guide elements together advantageously form a carrier module which is placed like a cover on a pot-shaped part of the housing and can be connected to it in a form-fitting manner and/or by gravity. This makes it possible to greatly reduce the number of required components.

According to one embodiment of the sensor device of this inventions, the radiation emitter and the radiation receiver are arranged on a common circuit board, with optical axes thereof being oriented perpendicular to a pane with which the sensor device is to be used. The radiation guide elements of the sensor device are preferably arranged in a V-shape to the pane and are structured so that they are inclined at an acute angle to the pane for creating total reflection of the beams emitted by the radiation emitter at the outside surface of the pane. The resulting non-optimal alignment of the radiation receiver or radiation emitter with regard to radiation inlet or outlet faces of the radiation guide elements is thus compensated at least in part by the fact that the radiation path is relatively short and is free of necessary reflections. Because the radiation emitter and the radiation receiver are arranged flat on the circuit board, assembly of the circuit board is simplified and required installation space for the radiation emitter and receiver, which are preferably structured as SMD (surface mounted device) components, is reduced, so the housing of the sensor device can be structured to be generally shallower.

According to a further embodiment of the invention, a spacer is provided, extending between the circuit board and the wall and thus defining distances from the radiation emitter and receiver to the respective radiation guide elements.

As mentioned above, it is also an object of the present invention to provide a method of producing a sensor device that can be carried out inexpensively and by simple manufacturing technology.

To achieve this object, a method for producing a sensor device to be attached to a side of a light-transmissive pane of a motor vehicle by a transparent coupling medium, the sensor device having at least one radiation guide element which conducts radiation between a radiation emitter and/or a radiation receiver in a housing and an opposite side of a light-transmissive pane, involves: forming together as one piece of resinous plastic the at least one radiation guide element with a wall of the housing bordering the radiation guide element by an, at least, two-stage injection molding operation. In this regard, either the radiation guide element is molded of a transparent plastic material in a first stage, and then in a second stage a non-transparent plastic material is injected onto and about it to form the wall, or in a first stage the wall is molded of the non-transparent plastic material, forming at least one opening, and in a second stage the radiation guide element is molded onto an edge of the wall defining the opening.

A particular advantage of the method of this invention is that a carrier module of a plurality of radiation guide elements and non-transparent blocking elements surrounding them in an airtight manner can be easily produced, and this carrier module can be attached as a cover in a form-fitting and/or non-positive manner to a pot-shaped part to form a housing. Because the radiation guide elements are connected as one piece with the non-transparent blocking element, the number of components can be reduced. The carrier module thus formed creates a flat surface, so that a transparent coupling medium arranged between the carrier module and the pane may be arranged in a uniformly distributed manner. Because the radiation guide elements are held in openings of the blocking element by being integrally molded or sheath-injected therewith, an intimate and secure connection is created. The carrier module produced in this way has dimensional stability and permits a compact design of the sensor device.

BRIEF DESCRIPTION OF THE DRAWINGS

Further benefits, characteristics and details of the invention are explained in more detail below using embodiments shown in the drawings. The described and drawn features, can be used individually or in preferred combinations in other embodiments of the invention. The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE INVENTION

Figure 1:
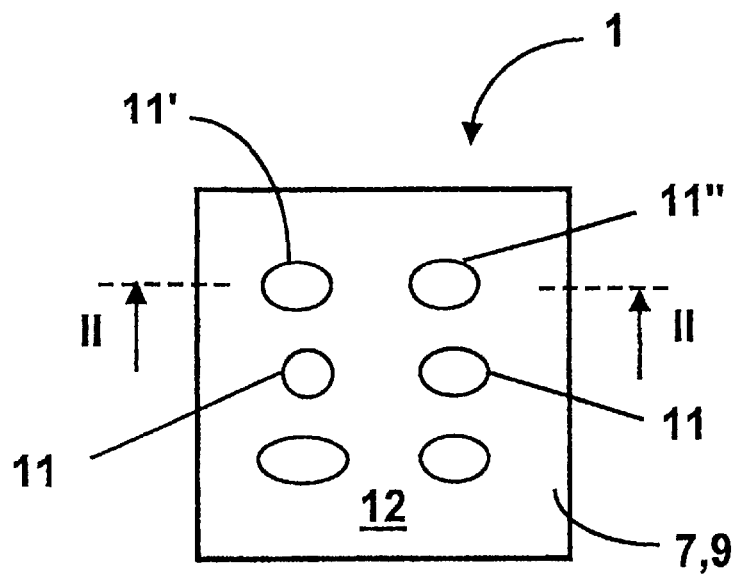
FIG. 1 is a top view of a sensor device of this invention.

A sensor device 1 basically comprises a housing 2 in which a radiation emitter 4 and a radiation receiver 5 are arranged on a circuit board 3, preferably a printed circuit board, along with a control and analysis circuit (not shown). The radiation emitter 4 is structured as an SMD (surface mounted device) sending diode, and the radiation receiver 5 is structured as an SMD receiving diode for infrared radiation. Radiation emitter 4 and radiation receiver 5 are arranged so they are flat on a side of the circuit board 3 facing the pane 6 of a motor vehicle, with optical axes of the radiation emitter 4 and radiation receiver 5 running perpendicular to the pane 6.

The circuit board 3 is mounted in a pot-shaped part of the housing 2 in a manner not shown here. A cover-like carrier module 7 is held in a form-fitting manner on the pot-shaped part. To this end, the carrier module 7 has projecting snapping catch arms 8 which engage in corresponding catch recesses on the pot-shaped part.

The cover-like carrier module 7 basically comprises a flat wall 7' which is structured as a non-transparent blocking element 9 which absorbs radiation. Blocking element 9 has a plurality of openings 10 at whose edges radiation guide elements 11, 11', 11" are connected. The radiation guide elements 11, 11', 11" are structured as radiation conductors or guides, such as light guides. The blocking element 9 extends about and borders the radiation guides 11, 11', 11" in a plane parallel to the pane 6. The individual radiation conductors 11, 11', 11" are structured to be essentially elongated, prism-shaped, and extend in pairs in a direction of the carrier module 7.

Figure 2:
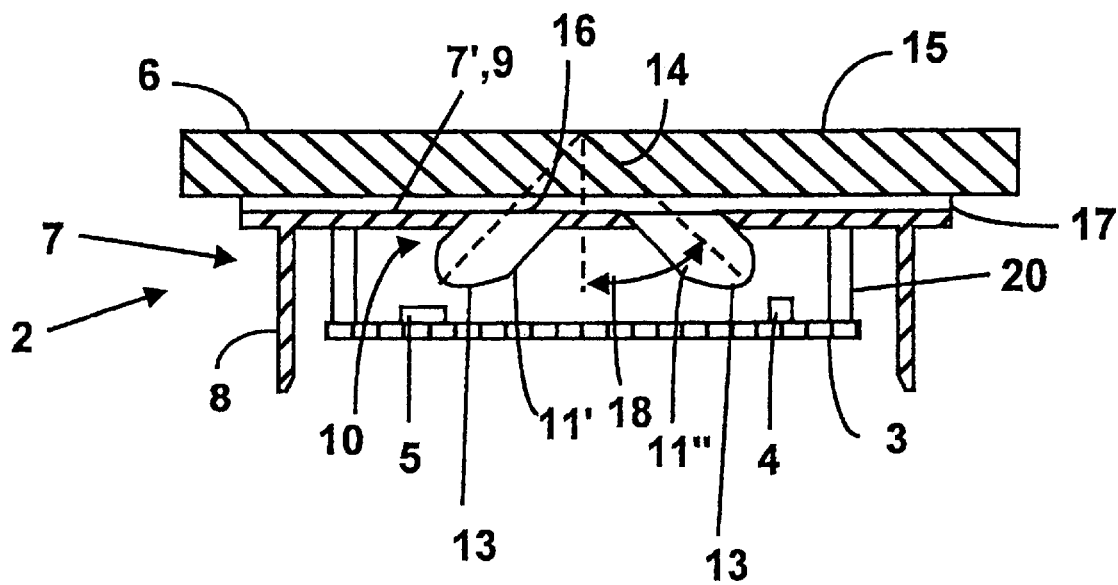
FIG. 2 is a partial sectional view taken through the sensor device along line II—II of FIG. 1.

The pair of radiation conductors 11', 11" illustrated in FIG. 2 project from a top side 12 of the carrier module 7 in a V-shape toward the corresponding radiation emitter 4 and radiation receiver 5. A convex radiation lens 13 is arranged as a collecting/directing element on the ends of each of the radiation conductors 11', 11" facing the radiation emitter 4 or the radiation receiver 5. A curvature of the radiation lens 13 is structured so that radiation emitted by the radiation emitter 4 is conducted substantially parallel to the optical axis 14 thereof, or parallel to a longitudinal axis of the radiation conductor 11" directed toward the radiation emitter 4, in a direction of the pane 6. After total reflection of the emitted radiation at an outside 15 of the pane 6, the reflected rays are bundled by the radiation lens 13 at the end of the radiation conductor 11' for radiation receiver 5, so the beams strike the radiation receiver 5 in a concentrated manner.

Each of the radiation conductors 11', 11" has an inclined face 16 on an end facing away from the circuit board 3, with the inclined face being aligned flush with the top side 12 of blocking element 9. The inclined faces 16 of the radiation conductors 11', 11" together with the top side 12 of the blocking element 9 form a one-piece planar bordering face of the carrier module 7 which is mounted adhesively onto the pane 6 by a transparent adhesive 17 as the coupling medium. The adhesive 17 preferably has the same optical properties, in particular a similar size refractive index, as does the pane 6 and/or the radiation conductors 11', 11".

For use of the sensor device 1 as a rain sensor, the radiation conductors 11', 11" are arranged at an inclination to the pane 6, so that light therefrom enters and leaves the pane 6 at the same incidence-and-emergence angle 18, which is equal to or larger than an angle which would cause total reflection at the outside surface 15 of pane 6 (approx. 42°).

As an alternative, the radiation conductors 11', 11" may also be aligned at a more acute angle to pane 6. This may be appropriate, for example, for creating a measurement area for detecting dirt on the outside 15 of pane 6. Although in this case no signal can be detected in the radiation receiver when the pane 6 is not dirty, when it is dirty a reception signal is generated at the radiation receiver 6 by beams being diffusely reflected by dirt particles, so that measures can be taken by a downstream electronic analyzer to remove the dirt from the pane 6.

As an alternative, the carrier module 7 may also be used to accommodate additional radiation conductors 11 in conjunction with associated sensors, so that an automotive lighting system or an automotive air conditioning system can be controlled as a function of detected brightness.

As shown clearly in FIG. 1, a plurality of sensors, such as rain sensors, automotive lighting sensors and solar sensors, may be accommodated inside the housing 2. The forms of the radiation conductors 11, 11', 11" will be adapted to the respective types of sensors.

The type of sensor illustrated in FIG. 2 serves as a rain sensor, where the signal picked up by the radiation receiver 5 is analyzed in an electronic analyzer to control a windshield wiper system of the automobile (not shown).

The circuit board 3 may preferably be connected by a spacer 20 to the wall 7'. The spacer 20 may have a plug connector for the circuit board 3 in an advantageous manner. The spacer 20 may also serve as a light shield for the radiation conductors 11', 11" in an advantageous manner. The circuit board 3 is aligned parallel to the wall 7'. To produce the sensor device 1, the circuit board 3, assembled with the radiation emitter 4 and the radiation receiver 5 as well as the control circuit (not shown), is inserted into the pot-shaped part of the housing 2. Then the carrier module 7 having the flat wall 7' and the plurality of radiation conductors 11, 11', 11" integrally molded in the openings 10 is placed on the pot-shaped part and attached to it with the snap locks. As an alternative, the connection may also be established by welding or gluing.

The carrier module 7 is produced by an injection molding operation in at least two stages. According to a first variant, the radiation conductors 11, 11', 11" may be made of a transparent plastic material, and then in a second stage which follows, a non-transparent plastic material is injected about, and onto, the radiation conductors 11', 11" to form the carrier module 7.

According to a second variant, the wall 7' may first be, again, made of the non-transparent plastic material, after which in a subsequent second process step the radiation conductors 11, 11', 11" are integrally molded of the transparent plastic material onto the wall at edges defining the openings 10 provided therefor.

The wall 7' and the radiation conductors 11, 11', 11" are preferably made of a polycarbonate (PC). Alternatively, other thermoplastic materials may also be used.

Depending on the spectral range of the measuring radiation and the spectral range in which the radiation receiver is sensitive, the radiation conductors and the wall may be structured to be transparent or not transparent for different spectral ranges. Various combinations are possible here.

Figure 3:
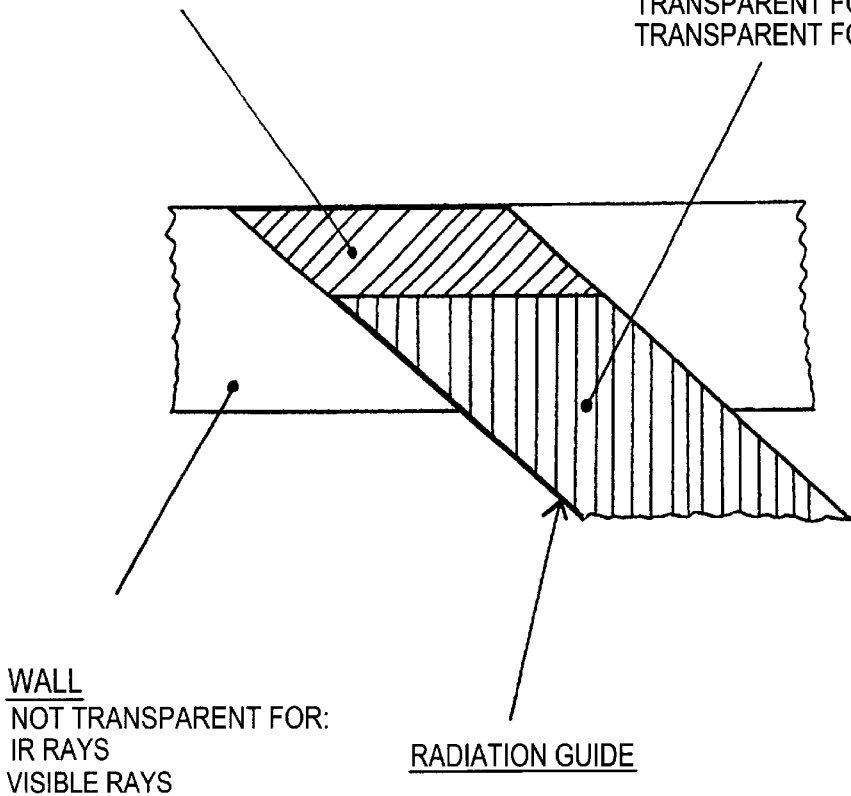
FIG. 3 is a partial sectional detail of a wall of the sensor device with a two-layer radiation conductor arranged in it.

1) For a sensor to detect moisture or soiling, an infrared emitter is preferably used. The choice of materials for the radiation conductor and the wall can also make a distinction here between two cases for spectral sensitivity of the radiation receiver, which is to be used. In the first case, the radiation receiver is not only sensitive for the IR measurement radiation but is also sensitive to at least part of the visible spectral range. In the second case, the radiation receiver is sensitive only for IR measurement radiation.

a) Use of a radiation receiver which is also sensitive to at least part of the visible spectral range in addition to the IR measurement radiation: In this case, the material used for the radiation conductor will be a material that is transparent for IR radiation but is not transparent for radiation from the visible spectral range. In a modification thereof (see FIG. 3), the radiation conductor is structured in two layers. In this regard, The first layer which faces the windshield when installed is made of a material that allows IR radiation to pass through but absorbs visible radiation. The second layer which faces away from the windshield is made of a material which is transparent for IR radiation and for visible radiation. This layered structure is also advantageously produced in a multistage injection molding process. The material used for the wall is not transparent for IR radiation or for radiation from the visible spectral range. If interfering radiation in the visible spectral range (incident solar radiation or other ambient light) coupled in through the radiation conductor is only minor in comparison with interfering radiation coming through the wall, the material of the radiation conductor may also be transparent in the visible spectral range. However, if input of interfering radiation in the visible spectral range through the wall is minor in comparison with interfering radiation coupled in through the radiation conductor, then the material of the wall may be structured to be non-transparent only for the IR range while being transparent for the visible spectral range.

b) Use of a radiation receiver which is sensitive only for IR measurement radiation: In this case, it is sufficient for the material of the radiation conductor to be transparent for the IR radiation and the material of the wall to be structured to be non-transparent for IR radiation, and both materials can be transparent for the visible spectral range.

2) When using measurement radiation in the visible spectral range (e.g., in the case of an ambient light sensor), still other requirements are made of the optical properties of the materials used. Here again, a distinction may be made between two cases. In the first case, the radiation receiver is at least slightly sensitive for IR radiation in addition to the measurement radiation in the visible spectral range. In the second case, the radiation receiver is sensitive only for the visible spectral range.

a) Use of a radiation receiver which is at least slightly sensitive for the IR radiation in addition to the visible spectral range: In this case, the material used for the radiation conductor will be transparent for visible radiation and non-transparent for IR radiation. The material used for the wall will be non-transparent for radiation from the visible range and for IR radiation. If interfering IR radiation coupled in through the radiation conductor is only minor in comparison with interfering input radiation through the wall, then the material of the radiation conductor may also be transparent for the IR range. However, if the input of interfering IR radiation through the wall is minor in comparison with the interfering input radiation through the radiation conductors, then the material of the wall may be structured to be nontransparent only for the visible spectral range while it may be transparent for the IR range.

3) If both IR measurement radiation and measurement radiation from the visible spectral range are used in the sensor device, then in carrying out the two-step injection molding process already mentioned above, a three-stage injection molding is used. Here radiation conductors which are transparent only for the IR radiation are formed in one stage, while in another stage radiation conductors that are transparent for visible radiation are formed. Finally, the radiation conductors thus formed are injection-sheathed by injection molding with a material which is not transparent for IR radiation or visible radiation to form the wall. The sequence may of course also be reversed, in which case the wall is produced first, forming openings, and then the materials to form the radiation conductors which are transparent for different spectral ranges are injected into the openings.

If the sensor device is a combined rain sensor and ambient light sensor (e.g., a solar sensor), then of course no radiation emitter is provided for the ambient light sensor in the housing.

As an alternative, radiation conductors 11, 11', 11" in the openings 10 may also be joined in the wall 7' by joining methods that involve substance fusing, in particular by laser welding or ultrasonic welding, or by gluing with an adhesive.

Due to the individual, separate-from-one-another, structures of the radiation conductors 11, 11', 11", the input and output areas on the top side 12 thereof are greatly reduced. In conjunction with this, an unwanted ambient radiation component from the environment, which could lead to falsification of the measurement results, is also reduced. This "optical separation" is achieved in particular through blocking element 9, which separates the radiation conductors 11, 11'.

As an alternative, the radiation lens may also be structured as a reflector spaced away from the radiation guide element, or as a prism body.

The sensor device of this invention may alternatively be used in a headlight area or in a rear window. It may be used in all cases where the presence of one or more particles is/are to be detected on a surface by using two elements having different transparencies for the type of radiation of sensors.

What is claimed is:

1. A sensor device for detecting a degree of wetting and/or soiling of a motor-vehicle pane, said sensor comprising:
   a wall being able to be coupled to a surface of said motor-vehicle pane;
   an emitter radiation guide element and a receiver radiation guide element extending through said wall;
   a radiation emitter and a radiation receiver; and
   collecting and directing coupling elements respectively associated with said radiation emitter and said radiation receiver, said collecting and directing coupling elements being respectively coupled to said emitter radiation guide element and said receiver radiation guide element, wherein optical axes of the collecting and directing coupling elements are aligned at acute angles to the motor-vehicle pane, and
   wherein end faces of the emitter and receiver radiation guide elements facing away from the radiation emitter and receiver are flush with a side of the wall facing the motor-vehicle pane, and wherein the emitter and receiver radiation guide elements are separate from each other and are structured as one piece with the wall,
   wherein said wall extends between the emitter and receiver radiation guide elements and is formed of a non-transparent material, and
   wherein each of the emitter and receiver radiation guide elements is held in its respective opening in the wall by fusion of materials.

2. The sensor device according to claim 1, wherein the emitter and receiver radiation guide elements are in openings in the wall which are spaced from one another and are arranged so that radiation emitted by the radiation emitter is reflected on an outside of the motor-vehicle pane only once before being detected by the radiation receiver.

3. The sensor device according to claim 1, wherein the radiation emitter and the radiation receiver are positioned on a common circuit board with the circuit board being arranged parallel to the motor-vehicle pane and the optical axes of the radiation emitter and of the radiation receiver being oriented perpendicular to the pane.

4. The sensor device according to claim 1, wherein a plurality of optical-guide element pairs arranged in the wall, each pair formed of emitter and receiver radiation guide elements projecting away from the wall in a V shape, with the radiation guide elements of one pair being arranged at an acute angles to a surface normal to the wall.

5. The sensor device according to claim 1, wherein each of the emitter and receiver radiation guide elements is structured in the form of an elongated optical member and wherein the end faces of the emitter and receiver radiation guide elements which are flush with the wall are inclined relative to longitudinal axes of the elongated optical members.

6. The sensor device according to claim 1, wherein each of the emitter and receiver radiation guide elements is integrally molded onto the edge of the wall forming its respective opening to thereby form a carrier module, with the carrier module having catch arms in an edge area thereof for locking engagement with a pot-shaped part of a housing which accommodates a circuit board which supports the radiation emitter and the radiation receiver.

7. The sensor device according to claim 6, wherein the circuit board is connected to the wall by a spacer, with a plug connector for the circuit board being integrated into the spacer.

8. A method of producing a sensor device for motor vehicles which is to be attached by a transparent coupling medium to a side of a light-transmissive pane of the motor vehicle, wherein at least one radiation guide element, which conducts radiation between one of a radiation emitter and a radiation receiver, is supported in a housing, said method comprising:
   forming an end face of the radiation guide element together with a wall of the housing as one piece of resinous plastic by an at least two stage injection molding operation comprising:
   a first stage wherein the radiation guide element is molded of a transparent plastic material and the wall is molded of a non-transparent plastic material, and
   a second stage wherein the radiation guide element and the wall are injection molded onto each other.

9. The method according to claim 8, wherein a softening point of the plastic material which is molded in a first stage is greater than a softening point of the plastic material which is molded in the second stage.

* * * * *